United States Patent [19]
Edem et al.

[11] Patent Number: 5,544,324
[45] Date of Patent: Aug. 6, 1996

[54] NETWORK FOR TRANSMITTING ISOCHRONOUS-SOURCE DATA USING A FRAME STRUCTURE WITH VARIABLE NUMBER OF TIME SLOTS TO COMPENSATE FOR TIMING VARIANCE BETWEEN REFERENCE CLOCK AND DATA RATE

[75] Inventors: Brian C. Edem, San Jose; Debra J. Worsley, Sunnyvale, both of Calif.

[73] Assignee: National Semiconductor Corporation, Santa Clara, Calif.

[21] Appl. No.: 969,911

[22] Filed: Nov. 2, 1992

[51] Int. Cl.$^6$ .............................. G06F 13/36; H04L 5/22
[52] U.S. Cl. .................... 395/200.17; 370/58.1; 370/105.1; 364/DIG. 1; 364/242.95; 364/284.4; 364/DIG. 2; 364/919; 364/942.3; 364/942.1
[58] Field of Search .............................. 370/85.15, 60.1, 370/58.1, 85.3, 105.1; 395/200, 200.17

[56] References Cited

U.S. PATENT DOCUMENTS

| | | | |
|---|---|---|---|
| 4,220,816 | 9/1980 | Howells et al. | 370/24 |
| 4,258,434 | 3/0981 | Glowinski et al. | 370/60 |
| 4,412,324 | 9/1983 | Glowinsky et al. | 370/58.1 |
| 4,530,088 | 7/1985 | Hamstra et al. | 370/110.1 |
| 4,549,292 | 9/1985 | Isaman et al. | 370/85.7 |
| 4,587,650 | 5/1986 | Bell | 370/85.5 |
| 4,637,014 | 1/1987 | Bell et al. | 370/85.7 |
| 4,771,426 | 9/1988 | Rattlingourd et al. | 370/102 |
| 4,845,609 | 7/1989 | Lighthart et al. | 395/200.1 |
| 4,876,683 | 10/1989 | Suzuki | 370/97 |
| 4,961,188 | 9/1990 | Lau | 370/94.2 |
| 4,977,582 | 12/1990 | Nichols et al. | 375/118 |
| 5,001,707 | 3/1991 | Kositpaiboon | 370/94.1 |
| 5,208,807 | 5/1993 | Gass et al. | 370/60.1 |

OTHER PUBLICATIONS

Aicardi et al. "Adaptive Bandwidth Assignment in a TDM network with hybrid frames", IEEE 1990 pp 41–48.
Integrated PBX Systems, An NCC State of the Art Report, The National Computing Centre Limited, 1987.
ISDN Basic Rate Interface System Design Guide, Telenetworks document, Aug. 1989.
ISDN Primary Rate Interface System Design Guide, Telenetworks document, Jul. 1989.
Draft Supplement to IEEE STD 802.3 CSMA/CD Access Method and Physical Layer Specifications, The Institute of Electrical and Electronic Engineers, Inc., (Nov. 15, 1989).
Apple Computer drawings, Mar. 5, 1990.
Irube et al., "Integrated Information and Communication System for Business Networks" *Hitachi Review* 40(3):241–247 (1991).
HMUX ERX "FDDI–II Hybrid Multiplexor" Rev. 2.4, 1991.
IBM Corporation "Task Order," pp. 6–7, 1992.
DP8390 "Network Interface Controller: An Introductory Guide," LAN Databook, pp. 206–213, 1992.

(List continued on next page.)

*Primary Examiner*—Thomas C. Lee
*Assistant Examiner*—D. Dinh
*Attorney, Agent, or Firm*—Limbach & Limbach L.L.P.

[57] ABSTRACT

A data communication system, such as a local area network, is provided with a capability of transmitting isochronous data. Preferably the system conveys both isochronous data and non-isochronous data by time-multiplexing the data into a recurring frame structure on a four-bit nibble basis. Bandwidth available for a particular isochronous source/sink is selectable and sustainable with a predefined granularity. Data rates can be adjusted by using "rate adjustment" time slots which can transmit data in some frames and "no data" in other frames. A particular time frame or template is provided which accommodates isochronous data, non-isochronous data, D channel data, maintenance data and frame synchronization signals. Non-isochronous operation and bandwidth allocation is independent and transparent to the isochronous data activity. Frame timing can be coordinated with one or more reference clock signals, e.g., from a public telephone or wide area network. A buffer can convert between the source/sink or hub circuitry data rates and the data rates for transmission over the physical media which, for a given type of data, is discontinuous on a small time scale.

25 Claims, 7 Drawing Sheets

OTHER PUBLICATIONS

DP83932B "Systems–Oriented Network Interface Controller", LAN Databook, pp. 288–383, 1992.

DP83950A "Repeater Interface Controller," LAN Databook, pp. 3–75, 1992.

DP83950EP at IEEE 802.3, Multi–Port Repeater Evaluation Kit, LAN Databook, pp. 75–87, 1992.

IEEE 802.9 Draft Standard Integrated Services (IS) LAN Interface at the MAC and PHY Layers, Institute of Electrical and Electronics, Nov., 1992.

"National Proposes Isochoronous Ethernet," *Electronic News*, vol. 38, No. 1940, p. 19, Nov., 1992.

"IBM's Multimedia Venture: Opportunity for its Hardware?", vol. 38, No. 1930, p. 1, Sep., 1992.

C. A. Gallagher 'IEEE 802.9: A Multi–Service Lan Interface', Second IEE National Conference on Telecommunications, Apr. 1989, York GB, pp.173–178.

H. Shimizu, et al., 'IVDLAN Standardization and Development', IEICE Transactions, vol. E74, No. 9, Sep. 1991, Tokyo, Japan.

Maxemchuk N. F., "Distributed Clocks In Slotted Networks", IEEE Infocom '88, pp. 0119–0125.

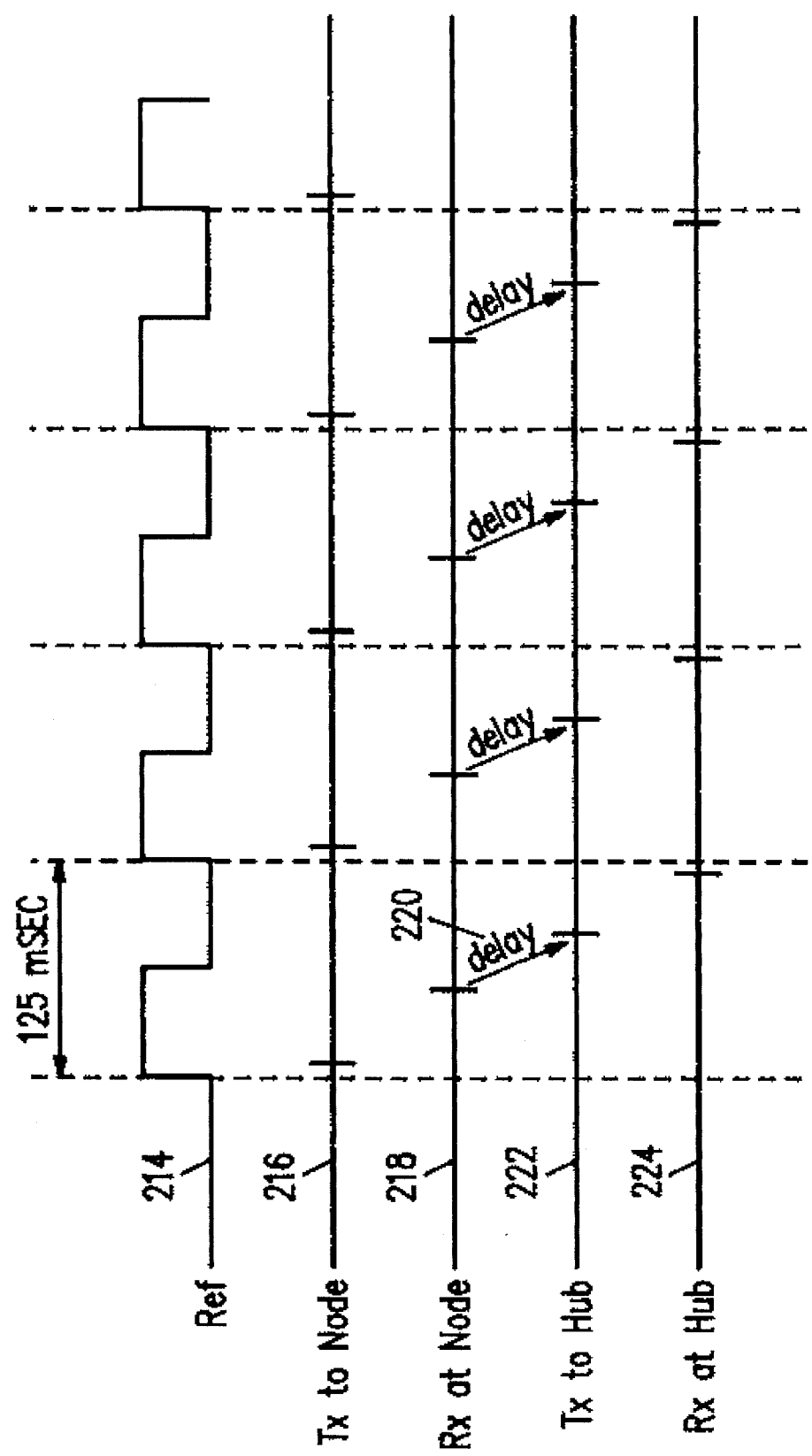

NETWORK FOR TRANSMITTING ISOCHRONOUS-SOURCE DATA USING A FRAME STRUCTURE WITH VARIABLE NUMBER OF TIME SLOTS TO COMPENSATE FOR TIMING VARIANCE BETWEEN REFERENCE CLOCK AND DATA RATE

The present invention relates to a data communication network, such as a local area network or wide area network, and in particular to a network for transferring isochronous data.

BACKGROUND OF THE INVENTION

In general terms, isochronous data is data which is non-packetized and of indeterminate, potentially continuous duration. Increasing availability of multi-media computers and work stations has contributed to an increase in interest in the transfer of data from isochronous data sources and sinks. An isochronous data source is a device which outputs data in a continuous stream, usually at a substantially constant average data rate. Examples include video cameras, which output a substantially continuous stream of data representing images and associated sounds, and telephone output, which can be a substantially continuous output of voice data (either analog or digitized). An example of an isochronous data sink is a video monitor which can receive a substantially continuous stream of video data for display.

Related to isochronous sources and sinks is the concept of data transfer which can also be either isochronous or non-isochronous. One type of non-isochronous data transfer is a packet-type transfer. As shown in FIG. 1A, data can be transferred in a plurality of packets 12a, 12b which can be either constant-sized or variable-sized. Each packet includes a field of data 14a, 14b which may be preceded and/or followed by non-data information such as preamble information 16a, 16b housekeeping information such as data source information, data destination information, and the like 18a, 18b and a frame end marker 20a. As seen in FIG. 1A, because the fields provided for data 14a, 14b are not substantially continuous, the packetized scheme of FIG. 1A is not isochronous but is "bursty" in nature. An example of packetized data transfer is the commonly-used ethernet system, one implementation of which, known as 10BASE-T is described in the Draft Nine Supplement to IEEE Standard 802.3, dated Nov. 15, 1989.

Another type of non-isochronous data transfer is a token ring system. In a token ring system, a node is permitted to transmit data only after receipt of an electronic "token." As depicted in FIG. 1B, a first station may transmit a token 22a which is received 24a by a second station whereupon the second station may begin transmission of data 26a. After a period of data transmission, the second station transmits the token 22b which is received by a third station 24b that can then begin its own transmission of data 26b. As seen in FIG. 1B, because data transmission is synchronized with the occurrence of an event (the arrival of a token), the token ring system is not an isochronous data transfer system. One commonly used token ring network is described in IEEE Standard 802.5.

In contrast, FIG. 1C schematically depicts isochronous data transfer. In isochronous data transfer, the data transfer or connection is initiated, such as by initiating a telephone conversation or beginning a video camera transmission 30. After the connection is initiated, transmission of the data, possibly accompanied by transmission of housekeeping information (such as destinations, audio or video timing and the like) is provided substantially continuously for an indeterminate period, such as until termination of the connection 32. Although it may be that not every bit transferred represents a data bit (since "housekeeping" bits may be also transferred), the transfer of data is substantially continuous in the sense that there are no substantial periods during which no data bits are transferred. It is possible that the data being transferred is "null" data such as silence during a telephone conversation or transfer of a blank video image. One type of isochronous data transfer is the Fiber Distributed Data Interface-II (FDDI-II) as described, for example, in *FDDI-II Hybrid Multiplexer*, Revision 2.4; dated Mar. 25, 1991.

Previous attempts to accommodate isochronous data on a data network have resulted in characteristics which are disadvantageous for at least some applications. Some previous devices and methods have transmitted data using a frame structure. However, previous devices have not adequately transmitted data in continuous time frames while accommodating the data rate needs of a variety of data sources and sinks, including both isochronous and non-isochronous data sources and sinks. Previous devices have not provided for sufficient independence of various source and sinks. Previous devices have not adequately provided for guaranteed sustainable and switchable bandwidth for isochronous data, and particularly have not permitted a user to select a desired bandwidth for transmission of isochronous data. Previous devices have not adequately provided for interaction of network with an external clocked system and particularly have not adequately provided for contention between two or more different external clocks for accommodation to the data rate of a non-selected or skewed external clock reference.

Accordingly, it would be advantageous to provide an isochronous data communication system in which data is transmitted in a frame structure while accommodating differing data rate requirements of various data sources and sinks. It would also be advantageous to provide a system in which the bandwidth for given isochronous sources or sinks can be selected with a predetermined granularity. It would also be advantageous to provide a network which can accommodate its timing to an external clock reference that can coordinate output from the network to different systems running according to two different clocks or according to skewed clocks.

SUMMARY OF THE INVENTION

The present invention provides for communication of data to and from isochronous data sources and sinks preferably in such a way that a predetermined bandwidth is available to an isochronous source/sink. Of the total bandwidth used for communication over the network links or physical media, at least a portion of the total bandwidth is dedicated to isochronous traffic. Preferably the bandwidth available for isochronous traffic can be selected or allocated with a predetermined granularity, e.g. so that the quality of transmission service desired for a given isochronous source or sink can be selected and the selected bandwidth can be sustained throughout the isochronous communication. Preferably a portion of bandwidth on the link is also dedicated to convey data to and from non-isochronous sources and sinks, as well as housekeeping information (such as information relating to data sources and destinations).

Preferably, the system of the present invention can be provided so that it is transparent to previously-available Media Access Controllers (MACs) and applications.

In one embodiment, data from an isochronous data source is time-division multiplexed with the data output from at least a second source using a predetermined frame structure. The second data source can include non-isochronous-sourced data, maintenance "M channel" data and connection control "D channel" data such as destination, source bandwidth and/or status information. Preferably, all four types of data are accommodated in the frame structure. The frame structure or template is constructed to satisfy the data rate requirements of the various data sources and sinks. The various types of data are transmitted in a substantially independent manner and, in particular, the occurrence of, e.g., data collision (of ethernet data) or a token loss (in token-ring protocol data) will not affect transmission of the isochronous data which can continue to be sent at an unchanged data rate despite the occurrence of data interruptions (e.g., collision or token loss) in other data types.

Because each frame has a pre-determined number of time slots for each type of data, and because the time frames repeat at a pre-determined interval, the effective data rate for any one of the types of data carried is constrained. According to one embodiment of the present invention, the frame has one or more time slots which can be used for adjusting the data rate to the particular data rate requirements of various data sources and sinks. For example, one or more time slots can be designated as rate-adjustment slots. The rate-adjustment slots can be used to carry the specified type of data during some time frames but do not carry that specified type of data during other time frames. For example, by alternating a rate adjustment time slot between "data" and "no data" a data rate adjustment which is equal to one half of the bandwidth represented by a single time slot can be achieved.

Preferably, the present system is implemented as a star-topology network with data sources transmitting to a central hub which, in turn, transmits the data to data sinks. A single node can act as both a source and a sink. Several such star-topology systems can be connected by providing interconnection of the hubs, for example, in a ring structure (FIG. 2) or to provide a tree structure. The multiplexed data which arrives at the hub is de-multiplexed to separate the isochronous-source data, the non-isochronous-source data and the D channel and maintenance information. The non-isochronous-source data can be provided to hub circuitry specialized for handling the non-isochronous data stream. The separated isochronous data is conveyed to circuitry configured for handling the isochronous data and transmitting to the destination nodes of the network or to connected hubs. Preferably, the hub has sufficient intelligence to set up and maintain isochronous communication sessions or calls which may be requested on the D channel.

The hub contains multiplexers for combining both isochronous-sourced data and other data, e.g. non-isochronous-sourced data. These data sources, along with M channel and D channel data, are multiplexed in a fashion similar to the multiplexing which occurred at the nodes and the multiplexed data is transmitted back to the nodes, preferably over a separate set of one-way twisted pair media. The nodes contain de-multiplexers, similar to those found in the hub.

The frame structure used for transmission over the media provides a data rate which, while substantially constant over a long time frame, is variable over a short time period (such as less than one template) and buffering can be used for smoothing the variable data rate to provide compatibility with the data rates of the various sources and sinks.

In one embodiment, the timing of the frame transmissions can be coordinated with a reference clock signal which is external to the network, (e.g., a reference clock for a different network or system.) For example, the external reference clock could be the reference clock of a public telephone system or other wide area network ("WAN"). The external reference clock can be provided to the network at the hub or at any node. The clock signal is then propagated throughout the rest of the network. When more than one external reference clock is available (e.g., when a local area network according to the present invention is coupled to two or more wide area networks) one of the external reference clocks is selected as the reference clock (e.g., using a contention system such as on FDDI, by station management (SMT). In the present invention, it is possible that a given node may transmit at a frame rate which differs slightly from a propagated reference clock. In this case, the frame length may be shortened or lengthened as needed for adjustment. In cases where two or more separately-clocked systems are connected to the network (e.g., two or more WAN's), a buffer can be provided for re-timing one or more of the output.

BRIEF DESCRIPTION OF THE DRAWINGS

FIG. 8 is a timing diagram showing the relative timing of transmissions and receptions at the hub and nodes.

DETAILED DESCRIPTION OF THE PREFERRED EMBODIMENT

Figure 1A:
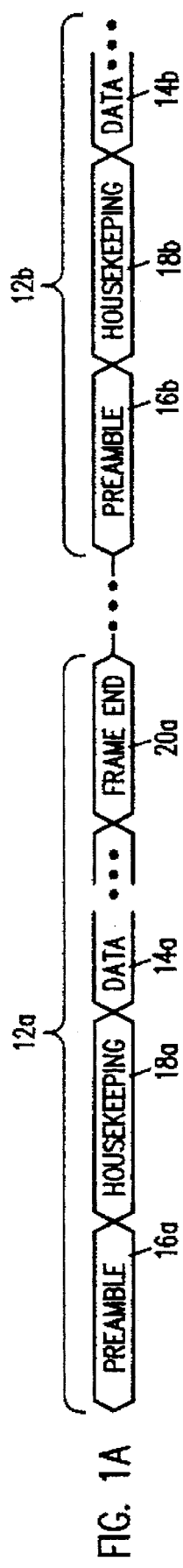
FIGS. 1A, 1B and 1C of the timing of a packet transmission system, a token ring transmission system, and an isochronous transmission system respectively.
Figure 1B:
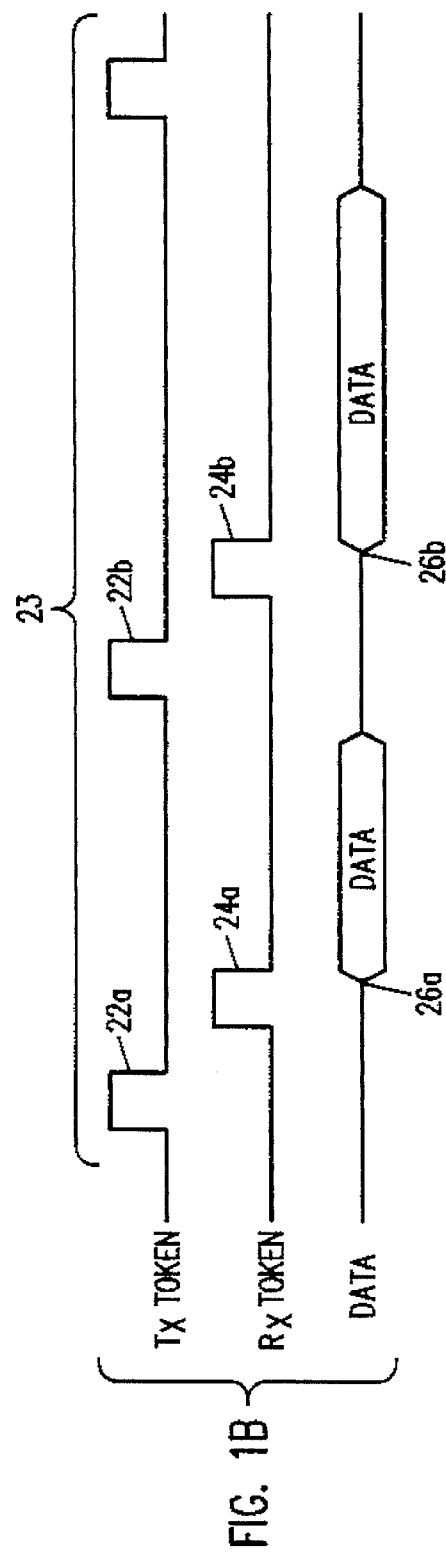
Figure 1C:
Figure 2:
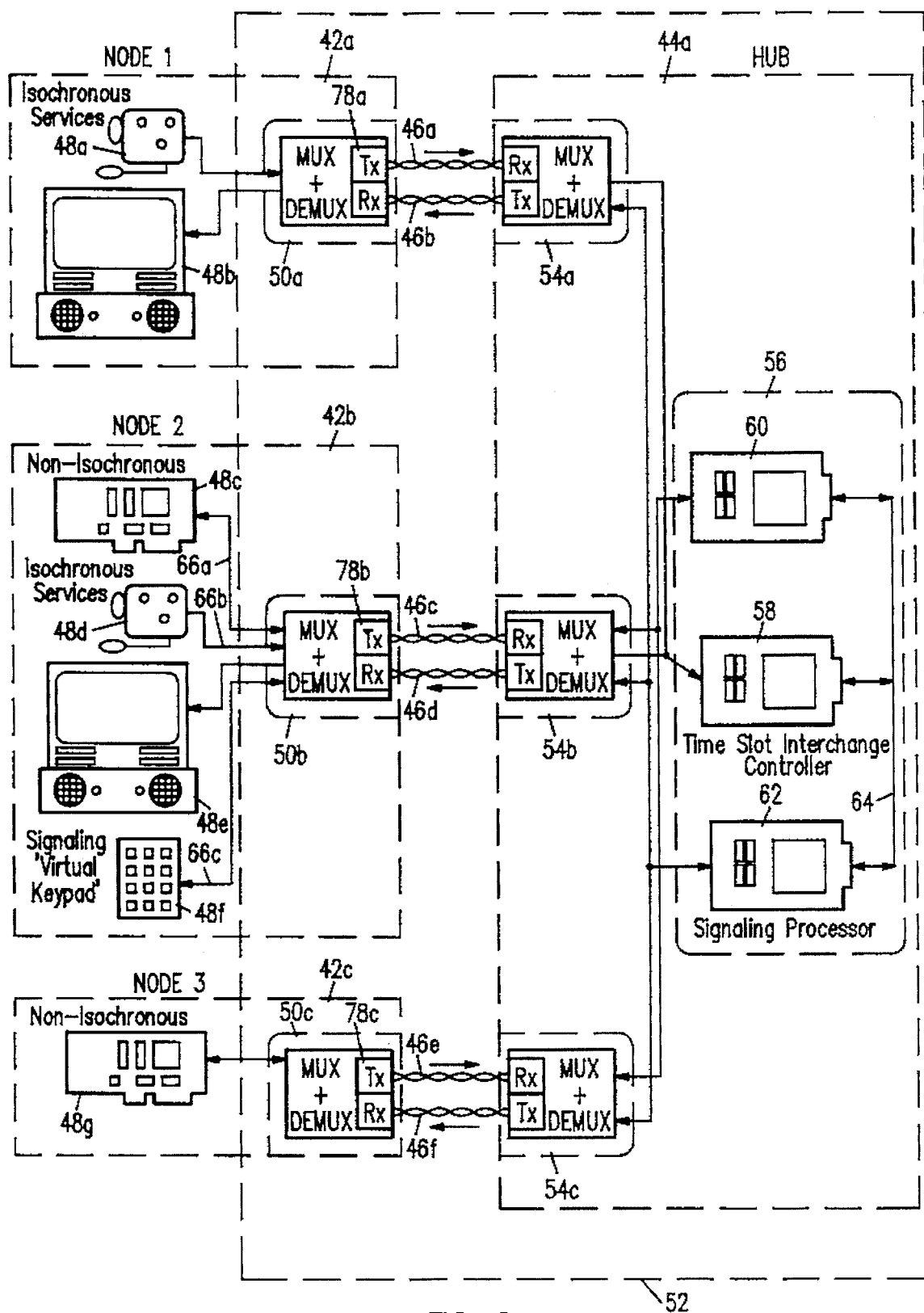
FIG. 2 is a schematic block diagram showing three nodes connecting to a hub card according to one embodiment of the present invention.
Figure 3:
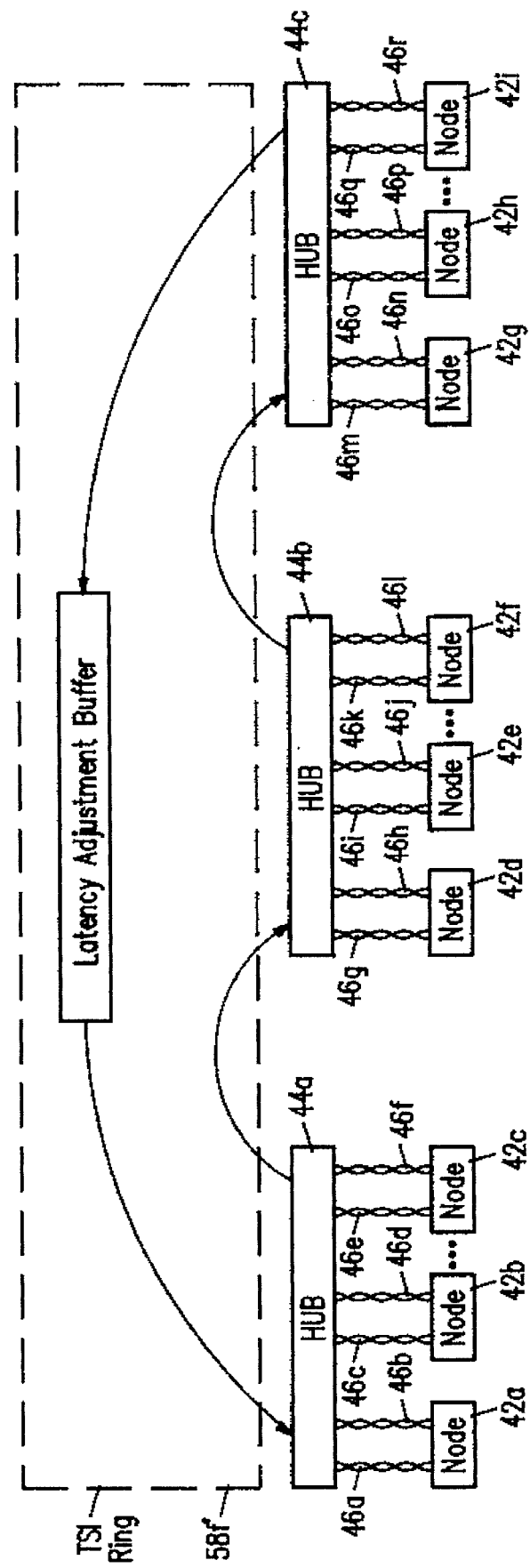
FIG. 3 is a schematic block diagram showing a number of hubs connected together using a ring structure.

According to an embodiment of the invention, a data communication system for isochronous data can be configured in a star-topology with a plurality of nodes 42a, 42b, 42c (FIG. 2), each coupled to a hub 44a by data links comprising physical data transmission media such as one-way twisted pair wires 46a–46f. The number of nodes can be adjusted depending on the data transmission needs and objectives of the system. In one embodiment, each hub is configured to accommodate connection with up to 16 nodes. Each node 42a, 42b, 42c includes circuitry 50a, 50b, 50c for receiving data, converting it to a form suitable for transmission onto the physical media 46a, 46c, 46e and receipt of signals from the physical media 46b, 46d, 46f and conversion to a form suitable for use by the data sinks. Each of the nodes 42a, 42b, 42c includes data sources and sinks 48a–48g. The data sources and sinks can be isochronous sources and sinks such as video cameras 48a, 48d and monitors 48b, 48e, non-isochronous sources and sinks such as an ethernet media access controller 48c, 48g, and control signaling or D channel sources and sinks such as an emulated or virtual key pad 48f provided, for example, on a personal computer (PC) terminal. Each of the nodes 42a, 42b, 42c can include various types of sources and sinks, e.g., strictly isochronous sources and sinks, such as depicted for node one 42a, strictly non-isochronous sources/sinks as depicted for node three 42c or both isochronous and non-isochronous sources and sinks as depicted for node two 42b. The physical layer 52 of the network system depicted in FIG. 2 includes the node data receivers and converters 50a, 50b, 50c, the physical media 46a–46f and the hub 44a.

The hub 44a includes circuitry 54a, 54b, 54c for receiving data from the physical media 46a, 46c, 46e separating the isochronous-sourced data from the non-isochronous-sourced data and the D channel and M channel data and converting separated data into a form suitable for handling by downstream hub circuitry 56. In the depicted embodiment the separated isochronous-sourced data is provided to a time slot interchange controller for placing the data on a high-bandwidth bus so that it can be transported to and retrieved by hub circuitry 54a, 54b, 54c for transmission to various destination nodes 42a, 42b, 42c. The separated non-isochronous data is provided to circuitry 60 configured to convey the non-isochronous data to the hub circuitry 54a, 54b, 54c for transmission to destination nodes 42a, 42b, 42c. In an embodiment in which non-isochronous-sourced data includes ethernet data, the hub circuitry 60 can be a standard ethernet repeater processor. In this way, a system which incorporates the present invention can be at least partially backwards-compatible with previous ethernet hub systems. The D channel and M channel data is provided to a signaling processor 62 which performs various maintenance and control functions such as identifying and alerting users of error conditions, and setting up requested calls, i.e. source/destination paths e.g. by communicating with the isochronous and non-isochronous controllers 58, 60, e.g. over data path 64.

Data sent from an isochronous device, e.g., 48d is a continuous stream of digitized data from such as a video camera. In one example, the data from isochronous device 48d will be taken as having a data rate equal to the American "T1" Standard of 1.544 Mbit/sec. Data output from the ethernet MAC 48c is provided at the standard 10BASE-T ethernet rate of 10 Mb/sec. D channel data is provided from the host processor or the ethernet MAC 48c or, for example, from the virtual key pad 48f at a variable data rate, such as a rate not exceeding about 64 Kb/sec. These incoming data streams are provided over lines 66a, 66b, 66c to node circuitry 50b. The incoming data from the various sources is provided to a multiplexer 70 which performs time-division multiplexing on a four-bit basis. The pattern for the time-division multiplexing is a repeating series of frames or templates. Preferably, the frames are repeated with a period which is the same as the public telephone network, (i.e., 125 microseconds). A clock signal is used for timing the frame transmissions, i.e, for establishing the points, (i.e., 125 microseconds), at which the transmission of each frame begins. According to one embodiment, the reference clock is initiated at one physical location in the network and propagated throughout the network. When the network is connected to an external system such as a public telephone network or other wide area network, the clock signal from the external system can be used to establish the reference clock for the network of the present invention. Thus, in one embodiment a hub or node is connected to a public telephone network and the frame sync from the public telephone network is propagated through the network of the present invention.

Figure 4:
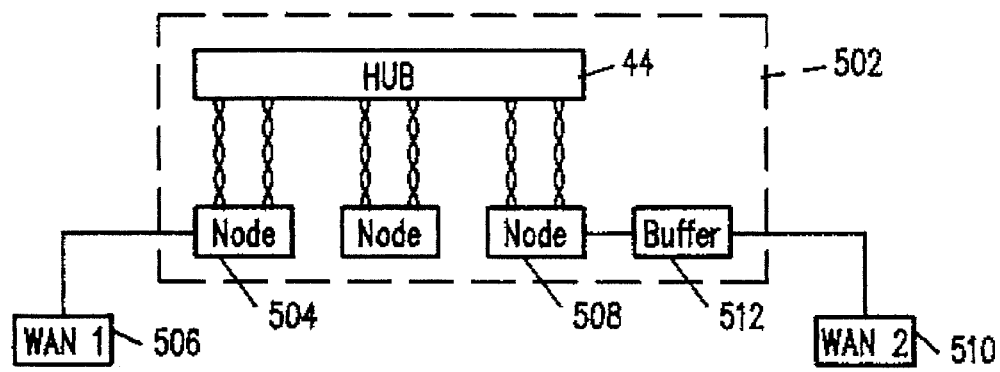
FIG. 4 is a schematic block diagram showing the relationship of timing signals from two wide area networks with a network according to the present invention.

In some instances, as depicted in FIG. 4, the network of the present invention 502 may be connected to more than one wide area network, (e.g., by connecting a first node 504 to a wide area network 506, and a second node 508 to a second wide area network 510.) In this case, one of the connections, e.g., 506 can be chosen, e.g., by the system administrator, as the reference of the network of the present invention. Communication with the other (non-selected) wide area network 510 is conducted by a buffer or a data storage device 512 containing multiple frames of data. The buffer 512, is preferably large enough to contain multiple frames of data in order to accommodate the phase and/or frequency skews between the frame structure of the network of the present invention 502, and the frame structure of the external system 510.

Table I depicts the manner in which the various data streams, and additional data and control bytes are time-division multiplexed. In the embodiment depicted in Table I, each frame is divided into four blocks with each block consisting of eight groups. There are 16 signals in each group, thus providing 512 paired symbols in each frame. Each symbol in Table I represents four bits of data so that every group of two symbols represents one 8-bit byte of data. In Table I, E represents four bits of data from the ethernet stream 16b, B designates four bits of data from the isochronous stream 66a, D represents four bits of data from the signaling or D channel stream 66c; and M represents four bits of maintenance data as described below. In addition, certain byte-length patterns are provided. JK represents a frame synchronization pattern and EM (the first two bytes of block three in Table I) represents an ethernet "pad" followed by a maintenance nibble as described below. Thus, the D channel time slots are found in the 257th and 248th time slots. The maintenance time slots are found in the 129th, 130th and 386th time slots. By positioning the D channel, M channel and frame synchronization symbols at the beginning of each block, the present invention is able to achieve a structured frame template usable with various non-isochronous protocols, with only minor modifications required. The resultant symmetry eases generation of the template. As seen in Table I, each frame contains 256 bytes which can be considered in thirty-two groups of eight bytes each, or four blocks of sixty-four bytes each. As seen in Table I, each block is headed by a symbol pair. The JK symbol pair is a unique synchronization pattern which indicates the beginning of the frame. The second block's header is the maintenance byte. The maintenance byte is used to convey information such as notification of the existence of a transmission error, or other signals to be conveyed to the far end of the link, such as other necessary physical layer information. The third block's header is the location of the D channel. The D channel is provided as a service to the user. The software and hardware can be configured to use the bandwidth of the D channel for a variety of purposes. It is anticipated that the D channel will be used for connection set-up and tear-down, which includes transmitting information related to the source node address and intended destination node address of data. Thus, the D channel can contain information which may be used by the hub to set-up calls, (i.e., to route information from a source to a destination.) The symbol pair heading the final block has a first symbol which is reserved for a networking scheme symbol. This symbol can be used as the "rate adjustment" time slot. Thus, it can be used either to provide data or "housekeeping" information in this time frame (termed an "over frame") or can carry a symbol indicating that no data is being transmitted in this time slot for this time frame (termed an "under frame"). The types of symbols which may be used for "housekeeping" information are specific to the type of data source or sink. For example, if the data source or sink is a token ring system, the housekeeping symbol might be the frame start delimiter. If the data source or sink is an ethernet system, the housekeeping symbol might represent "no-carrier" or "un-aligned data". Some networking schemes use the absence of carrier as an indication of the link state. In the ethernet protocol, the absence of carrier issues to mark the boundaries between packets. In the described frame structure, however, there is never an absence of carrier. Transmission is substantially continuous. Therefore, a "no carrier" state can be conveyed across the link using a unique symbol pattern outside the 0–F set of data patterns. These possibilities are described in greater detail in commonly assigned application Ser. No. 07/970, 329 now U.S. Pat. No. 5,361,261 titled "Frame-Based Transmission of Data" filed on even date herewith and incorporated herein by reference.

TABLE I

| | | | | | | | BLOCK 0: | | | | | | | | |
|---|---|---|---|---|---|---|---|---|---|---|---|---|---|---|---|
| J | K | E | B | E | B | E | B | E | B | E | B | E | B | E | Group 0 |
| E | E | E | B | E | B | E | B | E | B | E | B | E | B | E | Group 1 |
| E | E | E | B | E | B | E | B | E | B | E | B | E | B | E | Group 2 |
| E | E | E | B | E | B | E | B | E | B | E | B | E | B | E | Group 3 |
| E | E | E | B | E | B | E | B | E | B | E | B | E | B | E | Group 4 |
| E | E | E | B | E | B | E | B | E | B | E | B | E | B | E | Group 5 |
| E | E | E | B | E | B | E | B | E | B | E | B | E | B | E | Group 6 |
| E | E | E | B | E | B | E | B | E | B | E | B | E | B | E | Group 7 |
| | | | | | | | BLOCK 1: | | | | | | | | |
| M | M | E | B | E | B | E | B | E | B | E | B | E | B | E | Group 8 |
| E | E | E | B | E | B | E | B | E | B | E | B | E | B | E | Group 9 |
| E | E | E | B | E | B | E | B | E | B | E | B | E | B | E | Group 10 |
| E | E | E | B | E | B | E | B | E | B | E | B | E | B | E | Group 11 |
| E | E | E | B | E | B | E | B | E | B | E | B | E | B | E | Group 12 |
| E | E | E | B | E | B | E | B | E | B | E | B | E | B | E | Group 13 |
| E | E | E | B | E | B | E | B | E | B | E | B | E | B | E | Group 14 |
| E | E | E | B | E | B | E | B | E | B | E | B | E | B | E | Group 15 |
| | | | | | | | BLOCK 2: | | | | | | | | |
| D | D | E | B | E | B | E | B | E | B | E | B | E | B | E | Group 16 |
| E | E | E | B | E | B | E | B | E | B | E | B | E | B | E | Group 17 |
| E | E | E | B | E | B | E | B | E | B | E | B | E | B | E | Group 18 |
| E | E | E | B | E | B | E | B | E | B | E | B | E | B | E | Group 19 |
| E | E | E | B | E | B | E | B | E | B | E | B | E | B | E | Group 20 |
| E | E | E | B | E | B | E | B | E | B | E | B | E | B | E | Group 21 |
| E | E | E | B | E | B | E | B | E | B | E | B | E | B | E | Group 22 |
| E | E | E | B | E | B | E | B | E | B | E | B | E | B | E | Group 23 |
| | | | | | | | BLOCK 3: | | | | | | | | |
| E | M | E | B | E | B | E | B | E | B | E | B | E | B | E | Group 24 |
| E | E | E | B | E | B | E | B | E | B | E | B | E | B | E | Group 25 |
| E | E | E | B | E | B | E | B | E | B | E | B | E | B | E | Group 26 |
| E | E | E | B | E | B | E | B | E | B | E | B | E | B | E | Group 27 |
| E | E | E | B | E | B | E | B | E | B | E | B | E | B | E | Group 28 |
| E | E | E | B | E | B | E | B | E | B | E | B | E | B | E | Group 29 |
| E | E | E | B | E | B | E | B | E | B | E | B | E | B | E | Group 30 |
| E | E | E | B | E | B | E | B | E | B | E | B | E | B | E | Group 31 |

JK = Frame Synchronization Pattern
MM = 8 Maintenance Bits
D = D Channel
EM = Ethernet Pad & 4 Maintenance Bits
E = Ethernet Packet Channel
B = Isochronous Channel If the rate adjustment frame is an "over frame", (i.e., one in which data or housekeeping information is conveyed) then the symbol is one of the following: (a) housekeeping symbol; or (b) the data symbol representing one of the hexadecimal values 0 through F. If the symbol is an "under-frame", then a "no data symbol" is transmitted. In one embodiment, "no data" symbols are alternated with the other possibilities on an every-other-frame basis to provide an average of two bits of sourced information per frame cycle for this time slot. It would also be possible to provide other combinations such as transmitting "no data" one out of three frames, two out of three frames, one out of four frames, three out of four frames, and so forth. This allows the channel rate for a particular data to be "adjusted" precisely to the required amount for the networking scheme. Where more than two types of data sources each require "adjustment", (i.e., where a network carries both ethernet data and token ring data), one or more rate adjustment time slots can be provided for each of these data sources and sinks.

The second symbol in the symbol pair heading the fourth block consists of four additional maintenance bits. Together with the 8 maintenance bits from the second block, there are 12 maintenance bits which are used for physical layer signaling.

In one embodiment, each node or transmitter contains its own local crystal oscillator for determining the lengths of the time slots and, thus, the frames. Preferably, the data communication system as a whole is timed according to a reference clock signal which can be propagated through the network. Because of small variations in accuracy of the local crystal oscillators and/or the reference clock, it may happen that there are small frequency differences between the local crystal oscillator and the network reference clock signal such that, for example, the frames at a given node or transmitter are somewhat longer or shorter than the ideal frame length determined from the reference clock signal. In such a situation, according to one embodiment of the invention, the difference between the actual frame length (determined by the local crystal oscillator) and the desired or ideal frame length (determined by the network reference clock signal) is detected. and an adjustment is made to the frame length as often as needed to effectively shorten or lengthen the frame. In this embodiment, if the local clock is slow compared to the network clock reference, the last symbol of a frame is dropped (i.e., the last symbol of Group 31 depicted in Table I) to provide a frame having only 511 symbols. The data which would have been sent in the 512th symbol in a normal frame will then be added in the next sequential unused rate adjustment or "pad" time slot. If the local oscillator is fast, compared to the network reference clock, an additional symbol is added to a frame to produce a frame having 513 symbols. The added symbols is preferably added at the end of the normal 512 symbols of a normal frame. By detecting variances between the local clock and the reference clock and shortening or lengthening the frame as needed for adjustment, the present invention permits transmission of frames while relying on local oscillators which are substantially consistent with frame transmission rates determined by a network clock reference, without having to provide circuitry for strictly synchronizing a node or local transmitter to the network reference clock (such as by using a phase-lock loop system).

Figure 5:
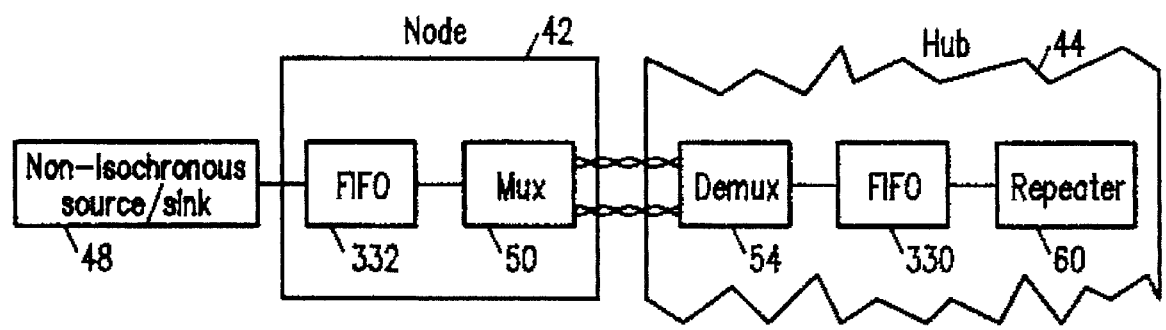
FIG. 5 is a partial block diagram depicting the relationship of a node FIFO and a hub FIFO to data sources, sinks and repeaters, according to an embodiment of the present invention.
Figure 6:
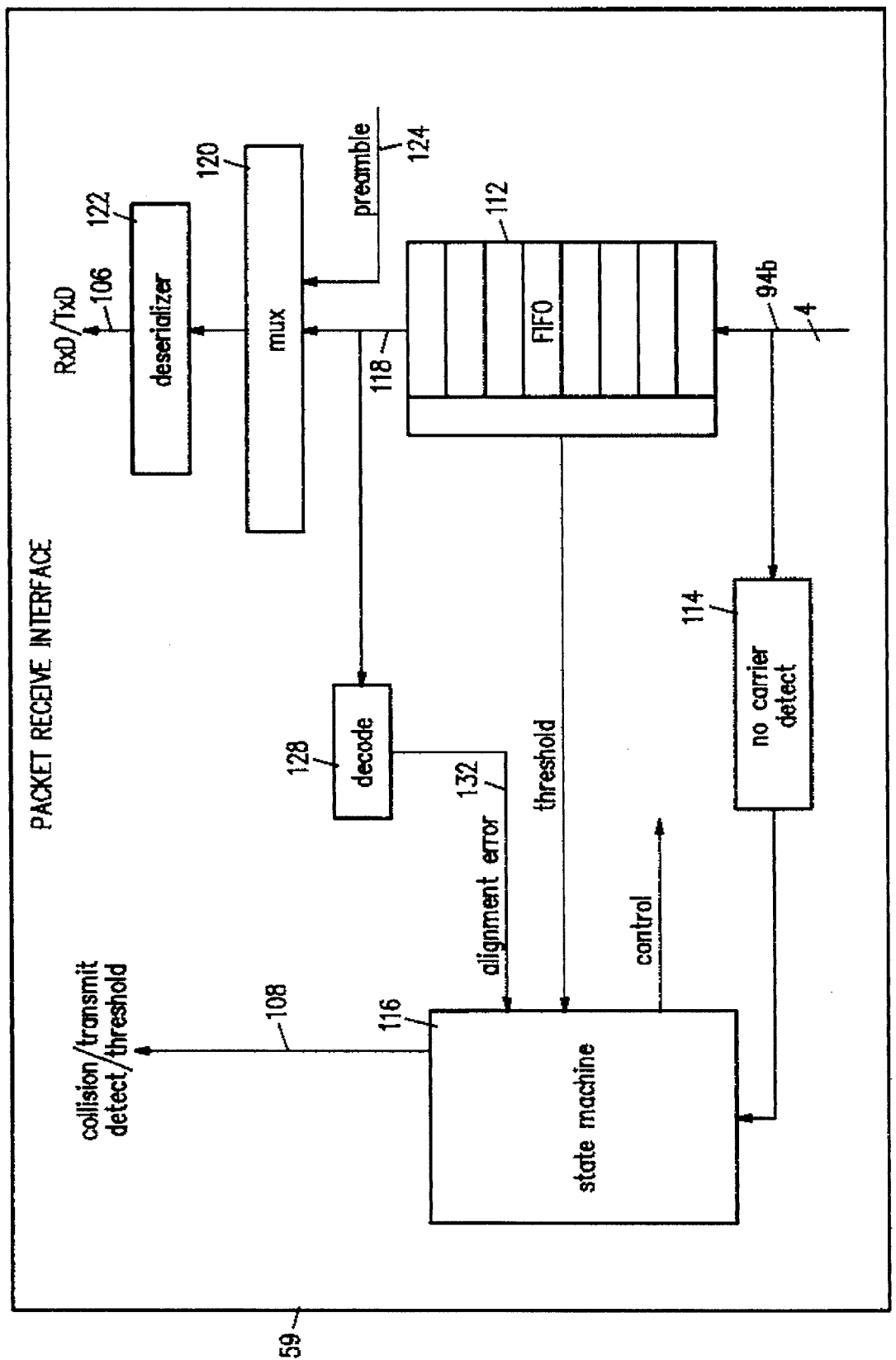
FIG. 6 is a block diagram depicting the packet receive interface, according to an embodiment of the present invention.

The structure imposed by the frame or template introduces an amount of jitter. In particular, when non-isochronous-sourced data, such as packet data is repositioned in time so as to fill the proper time slot for transmission, according to the frame structure of Table I, jitter is introduced. As depicted in FIG. 5, if data is to be repeated in the hub 44 upon reception; a small first-in-first-out (FIFO) memory 330 can be used for re-timing the data to eliminate the effects of the introduced jitter and provide the timing expected by the repeater circuitry 60. At the transmitting end, if the data to be transmitted onto the physical medium 46 is arriving from a source 48, whose rate cannot be directly controlled, the transmitted data can also be passed through a FIFO 332.

Preferably, the frame structure is provided so as to prevent an unacceptably large passage of time between sequential transmissions of particular data types in a given time frame. In the frame structure of Table I, there are no more than two time slots between any two sequential non-isochronous-sourced time slots in a single time frame and there are not more than five time slots between any two sequential isochronous-sourced time slots in a single time frame.

The depicted frame structure provides an allocation of bandwidth such that the data rate for the isochronous and non-isochronous data are compatible with, e.g., 10BASE-T ethernet data rates. Other types of frame structures could be used in connection with other isochronous and/or non-isochronous data sources and sinks such as token ring non-isochronous sources and sinks, in which case a different frame structure can be used to provide an allocation of bandwidth suited for the particular purpose.

The time-multiplexed data is then encoded by an encoder 72. In the depicted embodiment, the encoder performs four/five encoding. One particular form of four/five encoding conforming partially to the ANSII X3T9.5 standard, is depicted in Table II. The five bit code symbols of the particular four/five implementation have been chosen so as to maintain the AC balance of the physical medium, and to minimize the frequency spectrum of wave forms as they are transmitted along the physical medium. This eases the task of the data decoder, which is typically a phase lock loop device, in recovering the data and the transmission clock. These patterns, when properly combined, have a maximum of three bit times with no transition. With a bit rate of 48.8 ns, the minimum transition rate is 3.41 MHz or 146.5 ns between transitions.

TABLE II

| Symbol | Encoded (5 bit) | Decoded (4 bit) | Description |
| --- | --- | --- | --- |
| 0 | 11110 | 0000 | Data 0 |
| 1 | 01001 | 0001 | Data 1 |
| 2 | 10100 | 0010 | Data 2 |
| 3 | 10101 | 0011 | Data 3 |
| 4 | 01010 | 0100 | Data 4 |
| 5 | 01011 | 0101 | Data 5 |
| 6 | 01110 | 0110 | Data 6 |
| 7 | 01111 | 0111 | Data 7 |
| 8 | 10010 | 1000 | Data 8 |
| 9 | 10011 | 1001 | Data 9 |
| A | 10110 | 1010 | Data A |
| B | 10111 | 1011 | Data B |
| C | 11010 | 1100 | Data C |
| D | 11011 | 1101 | Data D |
| E | 11100 | 1110 | Data E |
| F | 11101 | 1111 | Data F |
| I | 11111 | 1010 | No Ethernet Carrier |
| S | 11001 | 0111 | No Ethernet Data |
| V | 01100 | 0010 | Unaligned Data |
| T | 01101 | 0101 | Unassigned |
| J | 11000 | 1101 | Frame Sync Part 1 |
| K | 10001 | 1101 | Frame Sync Part 2 |
| Q | 00000 | 0010 | Invalid |
| H | 00100 | 0001 | Invalid |
| R | 00111 | 0110 | Invalid |
| V | 00001 | 0110 | Invalid |
| V | 00010 | 0010 | Invalid |
| V | 00011 | 0010 | Invalid |
| V | 00101 | 0010 | Invalid |
| V | 00110 | 0010 | Invalid |
| V | 01000 | 0010 | Invalid |
| V | 10000 | 0010 | Invalid |

Comparing the standard ethernet signalling rate and data rate to that provided by the frame structure of Table I and encoding of Table II, it is seen that in the present scheme, a frame of data contains 313 "E" symbols or 1252 E bits. By transmitting frames at a rate of one frame every 125 microseconds, the present scheme has a capacity for transmitting 10.016 Mbits/sec of ethernet-sourced data interspersed with 6144 Kbits/sec of isochronous data.

As one example, it is assumed that the data rate output from the isochronous source 48$d$ is 1.544 Mbits/sec. However, the frame structure noted above provides an isochronous bandwidth capability of 6.144 Mb/s. Thus, the single isochronous source 48b in the present example can be entirely accommodated using only 48 of the 192 "B" symbols per frame (i.e. 24 bytes per frame or 192 bits per frame). This leaves 72 "B" symbols per frame unutilized by source 48d. Thus, it would be possible to use the isochronous channel of this embodiment of the invention to carry isochronous data from four isochronous sources, each outputting data at a rate of 1.544 Mb/sec. It would also be possible to use the described embodiment to carry the output from three isochronous sources, each outputting data at a rate of 2.048 Mb/sec (i.e. the CEPT European standard). A basic rate ISDN channel could be supported by using three 64 Kb/s slots within the isochronous channel or by e.g., 2 B slots and the D channel. It would also be possible to transmit data from up to 96 isochronous sources, each outputting data at a rate of 64 Kb/s. Thus, it is possible to use the present invention to transfer data from a single isochronous source outputting at a rate of 6.144 Mb/s or the isochronous bandwidth available may be allocated with a granularity of 64 Kb/s, i.e., it may be split into multiples of 64 Kb/s.

The data output is sent to a transmitter or driver 78a and the signal is transmitted over the physical medium 46c. The physical medium 46c can be any of a number of media types including twisted pair, coaxial or fiber optic cable.

The data sent over the physical media 46a is received in the hub 44a. The hub contains a plurality of circuit devices 54a, 54b, 54c, each one coupled to one of the nodes 42a, 42b, 42c by the physical media 46. Link detect circuitry receives the data from the physical media 46 for detection of the mode in which the node is operating, (e.g., 10BASE-T or isochronous ethernet) and outputting a mode select signal, as described more fully in commonly-assigned application, Ser. No. 07/971,-018, now abandoned, titled "Network Link Endpoint Capability Detection", filed on even date herewith and incorporated herein by reference). A de-multiplexer 92 separates the received data into the isochronous-sourced data 94a the non-isochronous-sourced data 94b and signaling data, such as D channel and maintenance data 94c.

Both the non-isochronous-sourced data 94b and the isochronous-sourced data 94a are made available to the various hub circuitry components 54a, 54b, 54c, as needed for transmission back to destination nodes.

Circuitry 58 can also be provided with a local loop-back capability. The local loop-back capability permits circuitry 58 to transfer data directly from the receive buffer 138a to the transmit buffer 154 without first placing the data onto the TSI ring 134, thus freeing TSI bus bandwidth. The multiplexer 156 can be used to control loop-back. Local loop-back capability is described more thoroughly in commonly-assigned application Ser. No. 07/969,910, now abandoned titled "Local Loopback of Isochronous Data in a Switching Mechanism", filed on even date herewith and incorporated herein by reference.

Figure 7:
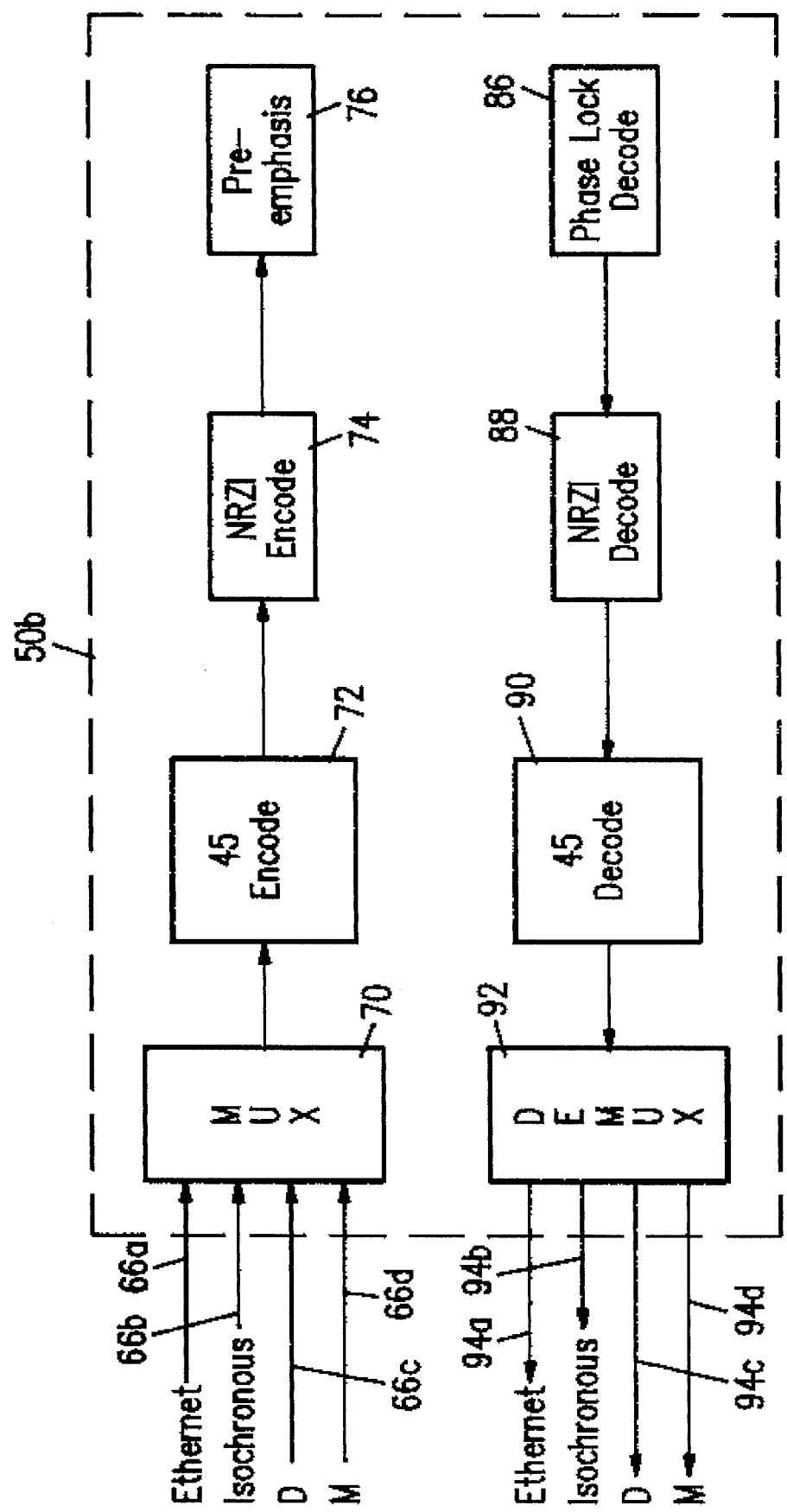
FIG. 7 is a schematic block diagram of node circuitry for multiplexing and preparing data for transmission over the media and for receiving information from the media and demultiplexing the data.

After the hub has received data from a node and conveyed it to another node for transmission to the destination node, the data which is intended for the destination node must be placed in a form suitable for transmission across the physical media 46. The data sent from the hub 44a to the nodes 42 is sent in a frame format which is preferably substantially the same as the frame format used for the data sent from the nodes 48 to the hub 44a as described above. At the nodes 42, the circuitry 50 includes devices (FIG. 7) for decoding and de-multiplexing data. Decoded and de-multiplexed data is then delivered to the various data sinks in the nodes 42.

In one embodiment, it is desirable to control the timing of the transmissions from the nodes 48 to the hub 44 and those from the hub 44 to the nodes 48 to assist in reducing delay and minimizing the amount of buffering memory required. In particular, it is desired that the hub 44 should be able to transmit to the nodes, over media 46a, 46c, 46e at about the same time that data transmitted from the nodes over media 46b, 46d, 46f is received at the hub. FIG. 8 depicts a scheme for achieving this type of timing. As shown in FIG. 8, the timing can be synchronized with a 125 microsecond reference clock signal 214. In this example, the reference signal 214 provides an ascending clock edge every 125 microseconds. The reference signal can be provided by any of a number of sources. Preferably, an embodiment of the present invention is configured to permit a reference signal 214 to be synchronized to an external clock reference, such as a reference signal from a wide band network or from a FDDI-II ring.

Each node and the hub device will contain its own high-accuracy transmission encoding clock, typically a crystal oscillator. Thus, when viewed at the bit level, the links 46 are synchronous to each other, being referenced only to the sourcing clock oscillator. Thus, according to an embodiment of the present invention, the synchronous frame structure is conveyed over synchronous links.

At the beginning of a cycle, the hub 44 will begin to transmit a frame to the node, as indicated by the timing marks on time line 216. Because of the line delays in the physical media, the time at which the nodes will receive the frame transmitted by the hub will lag the time when they were sent out from the hub as shown by time line 218.

The timing scheme described guarantees that the cycle received from the node will arrive slightly sooner than the next cycle will be transmitted from the hub. A small FIFO can be inserted into the hub's received data stream to accurately align the arrival of the cycle. In similar applications, it will also be advantageous to provide a FIFO in the node which would hold the data synchronized with the received cycle reference until it is to be transmitted. Provision of these FIFOs is described in more detail in commonly-assigned application Ser. No. 07/969,917 now abandoned, titled "Apparatus and Method for Accommodating Cable Length Delays Using Isochronous Fifoing", filed on even date herewith and incorporated herein by reference.

In light of the above description, a number of advantages of the present invention can be seen. The present invention is able to provide a frame-structured data transfer which can simultaneously accommodate the data rate needs of several types of data sources and sinks, preferably both isochronous sources and sinks and non-isochronous sources and sinks. Preferably, the frame structure also provides a bandwidth for maintenance information, D channel information, and frame synchronization information. Rate adjustment time slots in the data frames allow the data rates to be adjusted to the rates particular to various sources and sinks. Jitter introduced by the frame structure can be buffered using FIFO memories between the data links and the sources and sinks or hub repeaters. The timing of frame transmissions can be coordinated with clocks in external systems such as public telephone systems or other wide area networks. The frame structure permits one, several or all time slots intended for isochronous-sourced data to be allocated to a given isochronous source or sink. This permits bandwidth select ability and maintenance ability for the isochronous data, preferably with a pre-determined granularity such as 64 Kb granularity.

A number of modifications and variations of the invention can also be used. Although the frame structure of Table I is believed to be particularly useful for the mix of data anticipated in normal office or business installations having both isochronous and ethernet sources and sinks, other frame structures can also be provided. For example, in a situation where greater bandwidth is desired for ethernet traffic, it would be possible to provide a larger number of "E" time slots and a fewer number of one or all of the "B", "D", or "M" time slots. Further, if a token ring station was provided as one or more of the non-isochronous data sources or sinks, a number of non-isochronous-sourced time slots would be provided to accommodate the data rate needs of a token ring system. For example an isochronous-token ring system might require a larger bandwidth, such as a 22.4 Mbit/sec link. Such a system could be provided with a frame size of about 700 symbols so as to not exceed the 32 Mbit/sec signaling rate of typical token ring media. A frame structure could be provided with longer or shorter duration frames and/or longer or shorter duration time slots although the disclosed frame and time slot durations are believed particularly useful because the mapping non-isochronous and isochronous bandwidths maps into existing networking schemes, such as ethernet, ISDN, ATM and/or SONET. The disclosed frame and time slot durations provide the 10 Mbit/s bandwidth needed, e.g., for ethernet and providing a multiple of twelve 8 KHz channels, e.g., for isochronous, plus bandwidth, e.g., for controlling the link and isochronous connections. Although the disclosed frame structure provides for 64 Kbit/s of granularity for isochronous data, other granularities could be provided by altering the duration of time slots, the duration of time frames, or the number of data bits transmitted per time slot. The timing for frame transmissions could be derived from sources other public telephone network or other wide area networks, such as an internal reference clock T1 (1.544 Mbit/s) link, or ISDN connection, or asynchronous transfer mode (ATM). It is possible to use some aspects of the invention without using other aspects. For example, it would be possible to use the frame structure of Table I without providing a buffer for accommodating a second external clock.

Although the present invention has been described by way of preferred embodiments and certain variations and modifications, other variations and modifications can also be used, the invention being defined by the following claims.

What is claimed is:

1. In a local area network, apparatus for transmitting information onto physical media comprising:

means for receiving a plurality of inputs, including at least a first isochronous data stream and a second stream of data;

means for time-multiplexing information from said plurality of inputs by transmitting said information in a repeating pattern of time frames, each time frame having a plurality of time slots, each time frame having a substantially equal duration, substantially without pause between said plurality of time frames and each time slot being used to transmit a predetermined number of data bits;

wherein first predetermined ones of said time slots of each time frame are used for transmitting data bits from said first isochronous data stream and second predetermined ones of said time slots of each time frame are used for transmitting data bits from said second stream of data;

a reference clock for setting a duration of said time frame; and means for detecting a timing variance between said reference clock and a data rate of said inputs and altering the number of time slots in said time frame to compensate for said timing variance.

2. Apparatus, as claimed in claim 1, wherein said second stream of data is a non-isochronous-sourced data stream, said first isochronous data stream is transmitted at a first data rate and wherein said first data rate is independent of interruptions in transfer of said second stream of data.

3. Apparatus, as claimed in claim 1, wherein said second stream of data is ethernet-sourced data, having a potential for data-collision events, and said first isochronous data stream is transmitted at a data rate which is substantially unchanged in response to the occurrence of a data-collision event in said second stream of data.

4. Apparatus, as claimed in claim 1, wherein said second stream of data is token-ring-sourced data, having a potential for a token-loss event, and said first isochronous data steam is transmitted at a data rate which is substantially unchanged in response to the occurrence of a token-loss event in said second stream of data.

5. Apparatus, as claimed in claim 1, wherein said second stream of data is a non-isochronous-sourced data stream and wherein at least one of said time slots is used for transmitting data from said non-isochronous data stream during at least a first plurality of time frames, and said one of said time slots is used to transmit a non-data signal during a second plurality of time frames.

6. Apparatus, as claimed in claim 5, wherein said means for time-multiplexing transmits a predetermined pattern of said first plurality of frames and said second plurality of frames.

7. Apparatus, as claimed in claim 6, wherein said predetermined pattern is an alternation between said first plurality of frames and said second plurality of frames.

8. Apparatus, as claimed in claim 1, wherein said second stream of data is a non-isochronous-sourced data stream and wherein there are no more than two time slots between any two sequential non-isochronous-sourced time slots in a single time frame.

9. Apparatus, as claimed in claim 1, wherein there are no more than five time slots between any two sequential isochronous-source-filled time slots in a single time frame.

10. Apparatus, as claimed in claim 1, wherein the first and second time slots in each of said plurality of frames is used for transmitting frame synchronization symbols.

11. Apparatus, as claimed in claim 1, wherein said network includes a plurality of nodes, each connected to a hub and further comprising:

means for receiving said reference clock signal;

means for propagating said reference clock signal to said hub and to each of said nodes; and means for initiating transmission of said time frame at a predetermined time in relation to said propagated reference clock signal.

12. Apparatus, as claimed in claim 11, wherein said reference clock signal has a period equal to or a multiple or submultiple of 125 microseconds.

13. Apparatus, as claimed in claim 11, wherein said reference clock signal is provided by a wide area network.

14. Apparatus, as claimed in claim 11, wherein said reference clock signal is provided by a public telephone system.

15. Apparatus, as claimed in claim 11, wherein said network further includes:

means for receiving a second reference clock signal; and means for selecting said first clock signal as a signal for use by said means for initiating transmission.

16. Apparatus, as claimed in claim 15, further comprising:

a buffer for storing data transmitted on said physical medium to permit output from said network synchronized with said second reference clock signal.

17. An apparatus as set forth in claim 11 wherein at least one of said nodes has a local clock which determines said rate of said inputs associated with said node and said means for detecting adds a time slot to said time frame when said local clock is faster than said reference clock and drops a time slot from said time frame when said local clock is slower than said reference clock.

18. An apparatus as set forth in claim 1 wherein said rate of said input streams is determined by a local clock and said means for detecting adds a time slot to said time frame when said local clock is faster than said reference clock and drops a time slot when said local clock is slower than said reference clock.

19. An apparatus as set forth in claim 18 wherein said dropped time slot is a last one of said time slots in said time frame and said added time slot is added after said last time slot.

20. Apparatus, as claimed in claim 18, wherein each of said time frames nominally includes 512 time slots.

21. Apparatus, as claimed in claim 20, wherein said second stream of data is data-routing information and said second predetermined ones of said time slots are the 257th and 258th of said time slots.

22. Apparatus, as claimed in claim 20, wherein said second stream of data includes maintenance information and said second predetermined ones of said time slots are the 129th, 130th and 386th time slots.

23. Apparatus as claimed in claim 1:
wherein at least one of said plurality of inputs includes a first portion of data received at a first data rate, and wherein said means for time multiplexing includes means for discontinuously transmitting said first portion of data onto said physical media in a plurality of time slots, at least two of said plurality of time slots being separated by at least one time slot during which none of said first portion of data is transmitted, to provide a second discontinuous data transmission rate; and
further comprising a buffer for receiving said first portion of data at said first data rate and outputting at least said first portion of said data at said second discontinuous data transmission rate.

24. Apparatus, as claimed in claim 23, wherein said buffer includes a first-in-first-out memory.

25. In a local area network, a method for transmitting information onto physical media coupled to a plurality of data source/sinks, including at least a first isochronous data source/sink, the method comprising:
receiving, at a first of said plurality of data source/sinks, a plurality of inputs, including at least a first isochronous data stream and a second stream of data, said first isochronous data stream including at least data from said first isochronous data source/sink;
time-multiplexing information from said plurality of inputs by transmitting said information onto said physical medium in a repeating pattern of time frames, each time frame having a plurality of time slots, each time frame having a substantially equal duration, substantially without pause between said plurality of time frames and each time slot being used to transmit a predetermined number of data bits;
wherein a first plurality of said time slots are reserved for transmitting only data bits from said first isochronous data stream and second predetermined ones of said time slots are used for transmitting data bits from said second stream of data;
generating a reference clock for setting a duration of said time frame; and
detecting a timing variance between said reference clock and a data rate of said inputs and altering the number of time slots in said time frame to compensate for said timing variance.

* * * * *

UNITED STATES PATENT AND TRADEMARK OFFICE
CERTIFICATE OF CORRECTION

PATENT NO. : 5,544,324
DATED : August 6, 1996
INVENTOR(S) : Brian Charles Edem et al.

It is certified that error appears in the above-indentified patent and that said Letters Patent is hereby corrected as shown below:

In Col. 14, line 13, delete "steam" and replace with --stream--.

Signed and Sealed this

Twenty-ninth Day of October 1996

Attest:

BRUCE LEHMAN

Attesting Officer

Commissioner of Patents and Trademarks